(12) United States Patent
Zhou

(10) Patent No.: US 11,306,185 B2
(45) Date of Patent: Apr. 19, 2022

(54) METHOD FOR PREPARING POLYMER NANOCOMPOSITE

(71) Applicant: WUHAN CHINA STAR OPTOELECTRONICS TECHNOLOGY CO., LTD., Hubei (CN)

(72) Inventor: Yongxiang Zhou, Wuhan (CN)

(73) Assignee: WUHAN CHINA STAR OPTOELECTRONICS TECHNOLOGY CO., LTD., Hubei (CN)

(*) Notice: Subject to any disclaimer, the term of this patent is extended or adjusted under 35 U.S.C. 154(b) by 364 days.

(21) Appl. No.: 16/488,399

(22) PCT Filed: Apr. 17, 2019

(86) PCT No.: PCT/CN2019/082994
§ 371 (c)(1),
(2) Date: Aug. 23, 2019

(87) PCT Pub. No.: WO2020/133815
PCT Pub. Date: Jul. 2, 2020

(65) Prior Publication Data
US 2021/0355286 A1 Nov. 18, 2021

(30) Foreign Application Priority Data
Dec. 29, 2018 (CN) .......................... 201811638213.1

(51) Int. Cl.
*C08J 3/21* (2006.01)
*C08K 13/02* (2006.01)
(Continued)

(52) U.S. Cl.
CPC ............... *C08J 3/212* (2013.01); *C08K 13/02* (2013.01); *C08L 23/06* (2013.01); *C08L 27/06* (2013.01);
(Continued)

(58) Field of Classification Search
CPC ............ C08L 23/06; C08L 27/06; C08J 3/212
See application file for complete search history.

(56) References Cited

U.S. PATENT DOCUMENTS

2005/0196552 A1 9/2005 Lehmann

FOREIGN PATENT DOCUMENTS

| CN | 1919920 A | | 2/2007 |
| CN | 101654524 A | * | 2/2010 |

(Continued)

OTHER PUBLICATIONS

English Machine Translation for CN101654524 A obtained Oct. 19, 2021 at https://patentscope.wipo.int/search/docs2/pct/WO2020133815/pdf/8-t5pQklq-5AjqWXOz_GHzr9r4G9_inumruTaoFpBURGDwGh_LuesukOYpZQPn5EP-SlzJloeWeZPZ4l952KFjntwyg-Rlb4OeJdKAh_V5wKTlTrRwjHTd52iRifly?docId=id00000054851431 (Year: 2010).*

(Continued)

*Primary Examiner* — Arrie L Reuther
(74) *Attorney, Agent, or Firm* — Benesch, Friedlander, Coplan & Aronoff LLP

(57) ABSTRACT

A method for preparing a polymer nanocomposite is provided with steps of (1) dissolving polyvinyl chloride; (2) dissolving polyethylene; (3) dissolving a polyvinyl chloride-polyethylene block copolymer; (4) adding a surfactant into a mixed solution obtained from the above-mentioned steps; (5) adding a light permeable material into the mixed solution; (6) adding an enforcement material into the mixed solution; (7) performing an ultrasonic mixing to the mixed solution; and (8) performing a rotary evaporation to the mixed solution.

17 Claims, 3 Drawing Sheets

(51) Int. Cl.
*C08L 23/06* (2006.01)
*C08L 27/06* (2006.01)
*C08L 53/00* (2006.01)

(52) U.S. Cl.
CPC ........... *C08L 53/00* (2013.01); *C08J 2323/06* (2013.01); *C08L 2205/03* (2013.01)

(56) References Cited

FOREIGN PATENT DOCUMENTS

| | | |
|---|---|---|
| CN | 103304935 A | 9/2013 |
| CN | 107245199 A | 10/2017 |
| CN | 108373847 A | 8/2018 |

OTHER PUBLICATIONS

"Polymer synthesis process", National Defence Industry Press.
"Dynamic Mechanical Studies of Co-crosslinked PVC/PE Blends", Chemical Journal of Chinese Universities.
"A New Method for Morphological Analysis of PVC/PE Blends", China Plastics.
C. Thongpin, et al. "Degradation Mechanism and Mechanical Properties of PVC in PVC-PE Melt Blends: Effects of Molecular Architecture, Content, and MFI of PE", Journal of Vinyl & Additive Technology.

* cited by examiner

300 adding polymer material and melting at a high temeprature — 310 adding a light permeable material into the mixture — 320 adding an enforcement material into the mixture — 330 adding the composite material into a twin screw extruder for blending extrusion — 340 cooling treatment to form the polymer nanocomposite — 350

FIG. 3

METHOD FOR PREPARING POLYMER NANOCOMPOSITE

CROSS REFERENCE TO RELATED APPLICATION

This application claims the priority of International Application No. PCT/CN2019/082994, filed on 2019 Apr. 17, which claims priority to Chinese Application No. 201811638213.1 filed on 2018 Dec. 29. The entire disclosures of each of the above applications are incorporated herein by reference.

FIELD OF INVENTION

The present invention relates to a preparation of a fingerprint identification material, and more particularly, to a method for preparing a polymer nanocomposite capable of improving fingerprint identification.

BACKGROUND OF INVENTION

At present, ultrasonic fingerprint identification technology is more resistant to water and oil contamination, has a stronger environmental adaptability, and can be used in more complex environments. As a result, it has gradually gained widespread attention and is being used more and more in various fields, for example, improvement of the security of electronic products such as mobile phones, computers, tablets and access control systems. Compared with traditional digital passwords, unlocking speed of the fingerprint is fast, and therefore it brings a lot of convenience to people's lives.

However, current ultrasonic fingerprint identification technology is not mature, and recognition performance of the ultrasonic fingerprint identification module is not ideal. For example, the signal contrast of the valley and the ridge of the finger is not high, and the signal-to-noise ratio is not high, resulting in difficult signal processing in later stage and therefore it is difficult to accurately identify the texture on the cell phone. This is because the fact that when the ultrasonic between the protective glass and the mobile phone reflects, the reflectivity of the fingerprint valley and the ridge is very close, which makes the fingerprint identification very difficult.

It is therefore important for science research and engineering applications to find out a material to replace a traditional protective glass in order to increase the reflectivity ratio of the valley to the ridge of the fingerprint and the performance of the ultrasonic fingerprint identification.

SUMMARY OF INVENTION

To solve above technical problems, the present invention provides a method for preparing a polymer nanocomposite.

The method for preparing a polymer nanocomposite includes the following steps of:

(1) dissolving polyvinyl chloride with a molecular weight of 50,000-110,000 at room temperature in tetrahydrofuran, wherein a mass ratio of polyvinyl chloride to tetrahydrofuran is 1:3 to 1:10;

(2) dissolving polyethylene with a molecular weight of 50,000-500,000 g/mol at 60° C. to 120° C. in benzene, wherein a mass ratio of polyethylene to benzene is 1:3 to 1:10;

(3) dissolving a polyvinyl chloride-polyethylene block copolymer with a molecular weight of 10,000-100,000 g/mol at 20° C. to 100° C. in another tetrahydrofuran;

(4) mixing solutions obtained from the step (1), the step (2), and the step (3) and adding a surfactant into the solutions;

(5) adding a light permeable material into the solution obtained from the step (4);

(6) adding an enforcement material into the solution obtained from the step (5);

(7) performing an ultrasonic treatment to the solution obtained from the step (6) for 1-3 hours at a temperature of 60-100° C.; and (8) performing a rotary evaporation to the solution obtained from the step (7), wherein a temperature of the rotary evaporation is 80-120° C. so as to form the polymer nanocomposite.

According to the method for preparing a polymer nanocomposite in one embodiment of the present invention, the polyvinyl chloride in the step (1) has a mass fraction of 5-90%.

According to the method for preparing a polymer nanocomposite in one embodiment of the present invention, the polyethylene in the step (2) has a mass fraction of 5-90%.

According to the method for preparing a polymer nanocomposite in one embodiment of the present invention, the polyvinyl chloride-polyethylene block copolymer in the step (3) has a mass fraction of 5-90%, and a mass ratio of the polyvinyl chloride-polyethylene block copolymer to the another tetrahydrofuran is 1:3 to 1:10.

According to the method for preparing a polymer nanocomposite in one embodiment of the present invention, the surfactant in the step (4) is stearic acid or sodium dodecyl benzene sulfonate.

According to the method for preparing a polymer nanocomposite in one embodiment of the present invention, the light permeable material in the step (5) is one of magnesium fluoride, titanium oxide, lead sulfide, and lead selenide, and the light permeable material has a mass fraction of 1-5%.

According to the method for preparing a polymer nanocomposite in one embodiment of the present invention, the enforcement material in the step (6) is fullerenes, carbon nanotubes, montmorillonite, or other nanoparticles, and the enforcement material has a mass fraction of 1-5%.

The present invention further provides a method for preparing a polymer nanocomposite, includes the following steps of:

(1) dissolving polyvinyl chloride with a molecular weight of 50,000-110,000 g/mol at room temperature in tetrahydrofuran;

(2) dissolving polyethylene with a molecular weight of 50,000-500,000 g/mol at 60° C. to 120° C. in benzene;

(3) dissolving a polyvinyl chloride-polyethylene block copolymer with a molecular weight of 10,000-100,000 g/mol at 20° C. to 100° C. in another tetrahydrofuran;

(4) mixing solutions obtained from the step (1), the step (2), and the step (3) and adding a surfactant into the solutions;

(5) adding a light permeable material into the solution obtained from the step (4);

(6) adding an enforcement material into the solution obtained from the step (5);

(7) performing an ultrasonic treatment to the solution obtained from the step (6) for 1-3 hours at a temperature of 60-100° C., and (8) performing a rotary evaporation to the solution obtained from the step (7), wherein a temperature of the rotary evaporation is 80-120° C. so as to form the polymer nanocomposite.

According to the method for preparing a polymer nanocomposite in one embodiment of the present invention, the polyvinyl chloride in the step (1) has a mass fraction of 5-90%, and a mass ratio of polyvinyl chloride to tetrahydrofuran is 1:3 to 1:10.

According to the method for preparing a polymer nanocomposite in one embodiment of the present invention, the polyethylene in the step (2) has a mass fraction of 5-90%, and a mass ratio of polyethylene to benzene is 1:3 to 1:10.

According to the method for preparing a polymer nanocomposite in one embodiment of the present invention, the polyvinyl chloride-polyethylene block copolymer in the step (3) has a mass fraction of 5-90%, and a mass ratio of the polyvinyl chloride-polyethylene block copolymer to the another tetrahydrofuran is 1:3 to 1:10.

According to the method for preparing a polymer nanocomposite in one embodiment of the present invention, the surfactant in the step (4) is stearic acid or sodium dodecyl benzene sulfonate.

According to the method for preparing a polymer nanocomposite in one embodiment of the present invention, the light permeable material in the step (5) is one of magnesium fluoride, titanium oxide, lead sulfide, and lead selenide, and the light permeable material has a mass fraction of 1-5%.

According to the method for preparing a polymer nanocomposite in one embodiment of the present invention, the enforcement material in the step (6) is fullerenes, carbon nanotubes, montmorillonite, or other nanoparticles, and the enforcement material has a mass fraction of 1-5%.

According to the method for preparing a polymer nanocomposite in one embodiment of the present invention, the polyvinyl chloride in the step (1) and the polyethylene in the step (2) are replaced with at least one of polymethylmethacrylate, polyurethane, polystyrene, polycarbonate, rubber, and nylon.

The present invention further provides a method for preparing a polymer nanocomposite, including the following steps of:

(1) mixing polyvinyl chloride having a molecular weight of 50,000-110,000 and a mass fraction of 5-90%, polyethylene having a molecular weight of 50,000-500,000 g/mol and a mass fraction of 5-90%, and a polyvinyl chloride-polyethylene block copolymer having a molecular weight of 10,000-100,000 g/mol to form a mixture, and then heating the mixture to a high temperature of 100-120° C. so as to melt the mixture at the high temperature;

(2) adding a light permeable material into the mixture, wherein the light permeable material has a mass fraction of 1-5%;

(3) adding an enforcement material into the mixture, wherein the enforcement material has a mass fraction of 1-5%, and the mixture, the light permeable material, and the enforcement material commonly form a composite material;

(4) adding the composite material into a twin screw extruder for blending extrusion, so as to allow the composite material to be mixed uniformly at 100-130° C. for 5-60 minutes followed by discharging the composite material; and (5) cooling the composite material to a temperature of −10 to 10° C. after the step (4) for 10 seconds to 2 minutes so as to form the polymer nanocomposite.

According to the method for preparing a polymer nanocomposite in one embodiment of the present invention, the polyvinyl chloride in the step (1) and the polyethylene in the step (2) are replaced with at least one of polymethylmethacrylate, polyurethane, polystyrene, polycarbonate, rubber, and nylon.

Compared with the prior art, the present invention solves the above technical problems by mixing two or several of polyethylene, polyurethane, polystyrene, polymethylmethacrylate, polycarbonate, rubber, and nylon in solvents or by using a twin screw extruder for blending extrusion to obtain a composite material with acoustic impedance matched with fingerprint ridge so as to significantly reduce the reflectivity of the fingerprint ridge thereby increasing the ratio of the valley to ridge of the fingerprint reflectivity and performance of the ultrasonic fingerprint identification. Additionally, the crystallization of the polymer material can be inhibited by quickly cooling and adding additives so that the crystallinity can be reduced and finally the transmittance and mechanical properties can be improved.

BRIEF DESCRIPTION OF DRAWINGS

FIG. 3 is a flowchart of a method for preparing a polymer nanocomposite according to Embodiment 2 of the present invention.

DETAILED DESCRIPTION OF PREFERRED EMBODIMENTS

Figure 1:
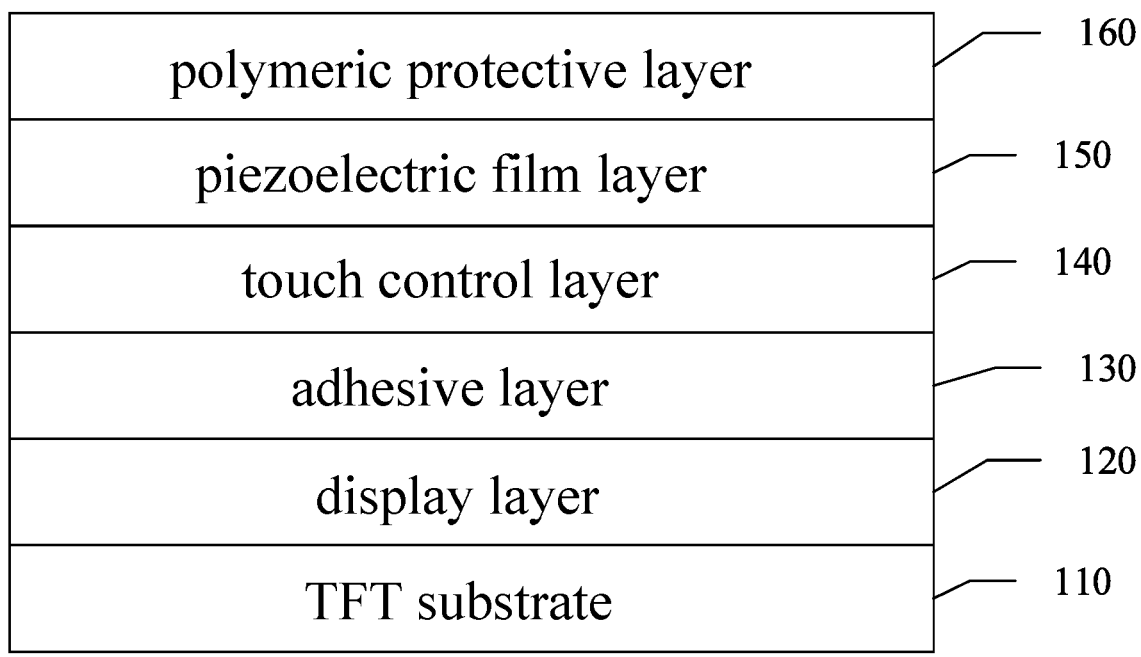
FIG. 1 is a schematic view of an ultrasonic fingerprint identification module.

The detailed description of the following embodiments is used for exemplifying the specific embodiments of the present invention by referring to the accompany drawings.

In order to make the above and other objects, features, and advantages in this disclosure more clearly understandable, the preferred embodiments of the present disclosure accompanying with the drawings will be detail described hereinafter. Furthermore, directional terms described by the disclosure, such as upper, lower, top, bottom, front, back, left, right, inner, outer, side, surrounding, central, horizontal, vertical, longitudinal, axial, radial, uppermost, and lowermost, etc., are only directions by referring to the accompanying drawings, and thus the directional terms are used to describe and understand the present invention, but the present invention is not limited thereto.

In the drawings, like reference numerals designate like elements throughout the specification.

The present invention is for the problem of an ultrasonic fingerprint identification module in the conventional technology that the contrast of the valley with the ridge of the finger signal is low, and the signal to noise ratio is low so that it is difficult to process the signal in the later stage and to accurately identify the texture of the finger. This embodiment provides a novel polymer nanocomposite for replacing the material of a protective layer in the conventional fingerprint identification module to improve the ratio of the valley to ridge of the fingerprint reflectivity and the effect of the ultrasonic fingerprint identification.

FIG. 1 is a schematic view of an ultrasonic fingerprint identification module 100.

In the ultrasonic fingerprint identification module 100, the lowest layer is a thin film transistor substrate 110. A display layer is provided on the thin film transistor substrate 110. An adhesive layer 130 is coated on the display layer 120. A touch control layer 140 is adhered on the display layer 120 through the adhesive layer 130. A piezoelectric film layer 150 is further provided on the touch control layer 140. Finally, a polymeric protective layer 160 is provided on the piezoelectric film layer 150.

This embodiment provides a method for preparing a protective layer. A novel polymer nanocomposite is synthesized for replacing the conventional protective layer (such as glass, sapphire, metal, or metal alloy) to improve the ratio of the valley to ridge of the fingerprint reflectivity and the effect of the ultrasonic fingerprint identification.

Embodiment 1

The Embodiment 1 provides a method for preparing a novel polymer nanocomposite. The required materials in this method include: two or several of polymethylmethacrylate, polyvinyl chloride, polyethylene, polyurethane, polystyrene, polycarbonate, rubber, and nylon; solvents; surfactants; light permeable materials; and enforcement materials.

Figure 2:
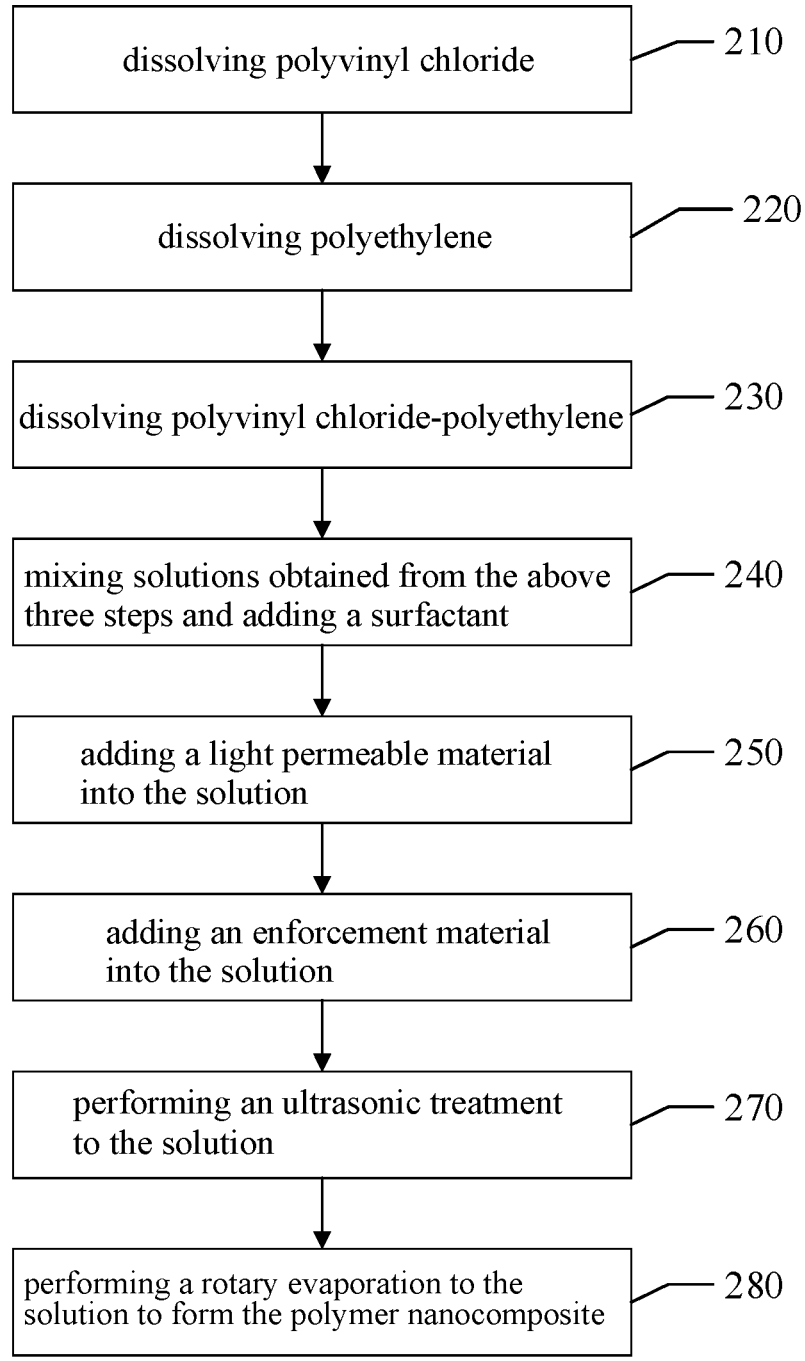
FIG. 2 is a flowchart of a method for preparing a polymer nanocomposite according to Embodiment 1 of the present invention.

As shown in FIG. 2, a method 200 is illustrated by polyvinyl chloride and polyethylene according to the Embodiment 1.

Step 210: dissolving polyvinyl chloride with a molecular weight of 50,000-110,000 g/mol at room temperature in tetrahydrofuran, wherein the polyvinyl chloride has a mass fraction of 5-90%, and a mass ratio of polyvinyl chloride to tetrahydrofuran is 1:3 to 1:10. It is characterized that the amount of the added solvents affects the dissolution rate and evaporation time.

Step 220: dissolving polyethylene with a molecular weight of 50,000-500,000 g/mol at 60° C. to 120° C. in benzene, wherein the polyethylene in the has a mass fraction of 5-90%, and a mass ratio of polyethylene to benzene is 1:3 to 1:10. It is characterized that the amount of the added solvents affects the dissolution rate and evaporation time.

Step 230: dissolving a polyvinyl chloride-polyethylene block copolymer with a molecular weight of 10,000-100,000 g/mol at 20° C. to 100° C. in another tetrahydrofuran, wherein the polyvinyl chloride-polyethylene block copolymer has a mass fraction of 5-90%, and a mass ratio of the polyvinyl chloride-polyethylene block copolymer to the another tetrahydrofuran is 1:3 to 1:10. It is characterized that the amount of the added solvents affects the dissolution rate and evaporation time.

Step 240: mixing solutions obtained from the above three steps and adding a surfactant into the solutions to decrease the surface tension of the system and increase the solubility of the mixture. It is characterized that the surfactant is stearic acid, or sodium dodecyl benzene sulfonate.

Step 250: adding a light permeable material comprising one of magnesium fluoride, titanium oxide, lead sulfide, and lead selenide into the solution obtained from the step 240 to increase the transmittance of the composite material. The light permeable material has a mass fraction of 1-5%.

Step 260: adding an enforcement material, such as fullerenes, carbon nanotubes, montmorillonite, or other nanoparticles, into the solution obtained from the step 250 to enhance the mechanical properties of the materials. The enforcement material has a mass fraction of 1-5%.

Step 270: performing an ultrasonic treatment to the solution obtained from the step 260 for 1-3 hours at a temperature of 60-100° C. so as to allow the ingredients in the solution to disperse uniformly and prevent molecular aggregation (the aggregation between molecules can significantly reduce material properties).

Step 280: performing a rotary evaporation to the solution obtained from the step 270 at 80-120° C. to quickly evaporate the solution and inhibit crystallization of the material, and finally, after the solvent is completely evaporated, the polymer nanocomposite is obtained.

Embodiment 2

The Embodiment 2 provides a method for preparing a novel polymer nanocomposite. The required materials in this method include: two or several of polymethylmethacrylate, polyvinyl chloride, polyethylene, polyurethane, polystyrene, polycarbonate, rubber, and nylon; light permeable materials; and enforcement materials.

As shown in FIG. 3, a method 300 is illustrated by polyvinyl chloride and polyethylene according to the Embodiment 2.

Step 310: mixing polyvinyl chloride having a molecular weight of 50,000-110,000 g/mol and a mass fraction of 5-90%, polyethylene having a molecular weight of 50,000-500,000 g/mol and a mass fraction of 5-90%, and a polyvinyl chloride-polyethylene block copolymer having a molecular weight of 10,000-100,000 g/mol to form a mixture, and then heating the mixture to a high temperature of 100-120° C. so as to melt the mixture at the high temperature.

Step 320: adding a light permeable material selected from a group consisting of magnesium fluoride, titanium oxide, lead sulfide, and lead selenide into the mixture to increase the transmittance of the composite material. The light permeable material has a mass fraction of 1-5%.

Step 330: adding an enforcement material, such as fullerenes, carbon nanotubes, montmorillonite, or other nanoparticles, into the mixture to enhance the mechanical properties of the material. The enforcement material has a mass fraction of 1-5%, and the mixture, the light permeable material, and the enforcement material commonly form a composite material.

Step 340: adding the composite material into a twin screw extruder for blending extrusion so as to allow the composite material to be mixed uniformly at 100-130° C. for 5-60 minutes followed by discharging the composite material.

Step 350: cooling the composite material to a temperature of –10 to 10° C. after the step 340 for 10 seconds to 2 minutes so as to form the polymer nanocomposite.

The embodiments of the present invention solve the above technical problems by mixing two or several of polyethylene, polyurethane, polystyrene, polymethylmethacrylate, polycarbonate, rubber, and nylon in solvents or by using a twin screw extruder for blending extrusion to obtain a composite material with acoustic impedance matched with fingerprint ridge so as to significantly reduce the reflectivity of the fingerprint ridge thereby increasing the ratio of the valley to ridge of the fingerprint reflectivity and performance of the ultrasonic fingerprint identification. Additionally, the crystallization of the polymer material can be inhibited by quickly cooling and adding additives so that the crystallinity can be reduced and finally the transmittance and mechanical properties can be improved.

The embodiments of the present invention provide a method for preparing a novel polymer nanocomposite, and the method can adjust the formulation and performance of the material according to the needs of the product. The ultrasonic fingerprint identification module using manufacturing process of the polymer nanocomposite provided by the present invention can increase the ratio of valley to ridge of the fingerprint reflectivity to enhance the performance of the fingerprint identification and the mechanical properties of the protective layer so as to extend service life.

The present disclosure has been shown and described with respect to one or more embodiments, and equivalents and modifications will be apparent to those of ordinary skill in the art. The present disclosure includes all such modifications and variations, and is only limited by the scope of the appended claims. In particular, with respect to the various functions performed by the above-described components, the terms used to describe such components are intended to correspond to any component that performs the specified function of the component (eg, which is functionally equivalent) (unless specifically indicated), even if it is structurally not identical to the disclosed structure for performing the functions in the exemplary implementation of the present specification shown herein. Moreover, although specific features of the specification have been disclosed with respect to only one of several implementations, such features may be combined with one or more other implementations as may be desired and advantageous for a given or particular application. Furthermore, the terms "including", "having", "containing", or the variants are used in the particular embodiments or claims, and such terms are intended to be encompassed in a manner similar to the term "comprising".

The above descriptions are merely the preferred embodiment according to the present invention. It should be noted that many changes and modifications to the described embodiments can be carried out by the skilled person in the art without departing from the scope and the spirit of the invention, and the changes and modifications are intended to be limited only by the appended claims

What is claimed is:

1. A method for preparing a polymer nanocomposite, comprising steps of:
   (1) dissolving polyvinyl chloride having a molecular weight of 50,000-110,000 g/mol at room temperature in tetrahydrofuran, wherein a mass ratio of polyvinyl chloride to tetrahydrofuran is 1:3 to 1:10;
   (2) dissolving polyethylene with a molecular weight of 50,000-500,000 g/mol at 60° C. to 120° C. in benzene, wherein a mass ratio of polyethylene to benzene is 1:3 to 1:10;
   (3) dissolving a polyvinyl chloride-polyethylene block copolymer with a molecular weight of 10,000-100,000 g/mol at 20° C. to 100° C. in another tetrahydrofuran;
   (4) mixing solutions obtained from the step (1), the step (2), and the step (3) and adding a surfactant into the solutions;
   (5) adding a light permeable material into the solution obtained from the step (4);
   (6) adding an enforcement material into the solution obtained from the step (5);
   (7) performing an ultrasonic treatment to the solution obtained from the step (6) for 1-3 hours at a temperature of 60-100° C.; and
   (8) performing a rotary evaporation to the solution obtained from the step (7), wherein a temperature of the rotary evaporation is 80-120° C. so as to form the polymer nanocomposite.

2. The method according to claim 1, wherein the polyvinyl chloride in the step (1) has a mass fraction of 5-90% in the solution obtained from the step (1).

3. The method according to claim 1, wherein the polyethylene in the step (2) has a mass fraction of 5-90% in the solution obtained from the step (2).

4. The method according to claim 1, wherein the polyvinyl chloride-polyethylene block copolymer in the step (3) has a mass fraction of 5-90% in the solution obtained from the step (3), and a mass ratio of the polyvinyl chloride-polyethylene block copolymer to the another tetrahydrofuran is 1:3 to 1:10.

5. The method according to claim 1, wherein the surfactant in the step (4) is stearic acid or sodium dodecyl benzene sulfonate.

6. The method according to claim 1, wherein the light permeable material in the step (5) is one of magnesium fluoride, titanium oxide, lead sulfide, and lead selenide, and the light permeable material has a mass fraction of 1-5% in the solution obtained from the step (5).

7. The method according to claim 1, wherein the enforcement material in the step (6) is fullerenes, carbon nanotubes, montmorillonite, or other nanoparticles, and the enforcement material has a mass fraction of 1-5% in the solution obtained from the step (6).

8. A method for preparing a polymer nanocomposite, comprising steps of:
   (1) dissolving polyvinyl chloride with a molecular weight of 50,000-110,000 g/mol at room temperature in tetrahydrofuran;
   (2) dissolving polyethylene with a molecular weight of 50,000-500,000 g/mol at 60° C. to 120° C. in benzene;
   (3) dissolving a polyvinyl chloride-polyethylene block copolymer with a molecular weight of 10,000-100,000 g/mol at 20° C. to 100° C. in another tetrahydrofuran;
   (4) mixing solutions obtained from the step (1), the step (2), and the step (3) and adding a surfactant into the solutions;
   (5) adding a light permeable material into the solution obtained from the step (4);
   (6) adding an enforcement material into the solution obtained from the step (5);
   (7) performing an ultrasonic treatment to the solution obtained from the step (6) for 1-3 hours at a temperature of 60-100° C.; and
   (8) performing a rotary evaporation to the solution obtained from the step (7), wherein a temperature of the rotary evaporation is 80-120° C. so as to form the polymer nanocomposite.

9. The method according to claim 8, wherein the polyvinyl chloride in the step (1) has a mass fraction of 5-90% in the solution obtained from the step (1), and a mass ratio of polyvinyl chloride to tetrahydrofuran is 1:3 to 1:10.

10. The method according to claim 8, wherein the polyethylene in the step (2) has a mass fraction of 5-90% in the solution obtained from the step (2), and a mass ratio of polyethylene to benzene is 1:3 to 1:10.

11. The method according to claim 8, wherein the polyvinyl chloride-polyethylene block copolymer in the step (3) has a mass fraction of 5-90% in the solution obtained from the step (3), and a mass ratio of the polyvinyl chloride-polyethylene block copolymer to the another tetrahydrofuran is 1:3 to 1:10.

12. The method according to claim 8, wherein the surfactant in the step (4) is stearic acid or sodium dodecyl benzene sulfonate.

13. The method according to claim 8, wherein the light permeable material in the step (5) is one of magnesium fluoride, titanium oxide, lead sulfide, and lead selenide, and the light permeable material has a mass fraction of 1-5% in the solution obtained from the step (5).

14. The method according to claim 8, wherein the enforcement material in the step (6) is fullerenes, carbon nanotubes, montmorillonite, or other nanoparticles, and the enforcement material has a mass fraction of 1-5% in the solution obtained from the step (6).

15. The method according to claim 8, wherein the polyvinyl chloride in the step (1) is replaced with one of polymethylmethacrylate, polyurethane, polystyrene, polycarbonate, rubber, and nylon, and the polyethylene in the step (2) is replaced with one of polymethylmethacrylate, polyurethane, polystyrene, polycarbonate, rubber, and nylon.

16. A method for preparing a polymer nanocomposite, comprising steps of:
(1) mixing polyvinyl chloride having a molecular weight of 50,000-110,000 g/mol, polyethylene having a molecular weight of 50,000-500,000 g/mol, and a polyvinyl chloride-polyethylene block copolymer having a molecular weight of 10,000-100,000 g/mol to form a mixture, and then heating the mixture to a high temperature of 100-120° C. so as to melt the mixture at the high temperature, wherein polyvinyl chloride has a mass fraction of 5-90% in the mixture, and polyethylene has a mass fraction of 5-90% in the mixture;
(2) adding a light permeable material into the mixture, wherein the light permeable material has a mass fraction of 1-5% in the mixture;
(3) adding an enforcement material into the mixture, wherein the enforcement material has a mass fraction of 1-5% in the mixture, and the mixture, the light permeable material, and the enforcement material form a composite material;
(4) adding the composite material into a twin screw extruder for blending extrusion, so as to allow the composite material to be mixed uniformly at 100-130° C. for 5-60 minutes followed by discharging the composite material; and
(5) cooling the composite material to a temperature of −10 to 10° C. after the step (4) for 10 seconds to 2 minutes so as to form the polymer nanocomposite.

17. The method according to claim 16, wherein in the step (1), the polyvinyl chloride is replaced with one of polymethylmethacrylate, polyurethane, polystyrene, polycarbonate, rubber, and nylon, and the polyethylene is replaced with one of polymethylmethacrylate, polyurethane, polystyrene, polycarbonate, rubber, and nylon.

\* \* \* \* \*